US009965494B2

(12) United States Patent
Horowitz

(10) Patent No.: US 9,965,494 B2
(45) Date of Patent: *May 8, 2018

(54) SHARING PHOTOS

(71) Applicant: Google Inc., Mountain View, CA (US)

(72) Inventor: Bradley Horowitz, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/825,706

(22) Filed: Aug. 13, 2015

(65) Prior Publication Data

US 2015/0347465 A1 Dec. 3, 2015

Related U.S. Application Data

(63) Continuation of application No. 13/723,068, filed on Dec. 20, 2012, now Pat. No. 9,116,926.

(51) Int. Cl.
*G06F 17/30* (2006.01)
*G06F 3/01* (2006.01)

(52) U.S. Cl.
CPC ........ *G06F 17/30268* (2013.01); *G06F 3/013* (2013.01); *G06F 17/3028* (2013.01); *G06F 17/30265* (2013.01); *G06F 17/30598* (2013.01); *G06F 17/30876* (2013.01)

(58) Field of Classification Search
USPC .................................. 707/705, 737
See application file for complete search history.

(56) References Cited

U.S. PATENT DOCUMENTS

| 5,850,352 | A | 12/1998 | Moezzi et al. |
| 6,437,758 | B1 | 8/2002 | Nielsen et al. |
| 7,046,924 | B2 | 5/2006 | Miller et al. |
| 7,054,850 | B2 | 5/2006 | Matsugu |
| 7,274,741 | B2 | 9/2007 | Ma et al. |
| 7,366,334 | B2 | 4/2008 | Yokota et al. |
| 7,396,129 | B2 | 7/2008 | Endrikhovski et al. |

(Continued)

FOREIGN PATENT DOCUMENTS

| EP | 1422923 | 5/2004 |
| EP | 2410733 | 1/2012 |
| WO | 2008/040576 | 4/2008 |

OTHER PUBLICATIONS

Giordano, Daniela et al. "Content Based Recommender Systems by Using Eye Gaze Data." Proceedings of the Symposium on Eye Tracking Research and Applications, ETRA '12. ACM. Mar. 28, 2012. pp. 369-372.

(Continued)

*Primary Examiner* — Kim Nguyen
(74) *Attorney, Agent, or Firm* — IP Spring

(57) ABSTRACT

Implementations generally relate to sharing photos. In some implementations, a method includes collecting photos associated with one or more objects, where the photos are collected from a plurality of users. The method also includes collecting attention information associated with the one or more objects. The method also includes generating an attention map based on the attention information. The method also includes grouping the one or more photos into groups of photos based on the attention map. The method also includes causing the groups of photos to be displayed to a target user based on one or more predetermined criteria.

20 Claims, 8 Drawing Sheets

(56) References Cited

U.S. PATENT DOCUMENTS

| | | | |
|---|---|---|---|
| 7,400,761 B2 | 7/2008 | Ma et al. | |
| 7,593,602 B2 | 9/2009 | Stentiford et al. | |
| 7,634,106 B2* | 12/2009 | Mino | G06K 9/00228 |
| | | | 382/103 |
| 7,769,740 B2 | 8/2010 | Martinez et al. | |
| 8,068,154 B2 | 11/2011 | Jacob et al. | |
| 8,098,886 B2 | 1/2012 | Koch et al. | |
| 8,229,915 B1* | 7/2012 | Lloyd | G06Q 30/0277 |
| | | | 707/609 |
| 8,428,390 B2 | 4/2013 | Li | |
| 8,478,111 B2 | 7/2013 | Stankiewicz et al. | |
| 8,560,625 B1* | 10/2013 | Hardman | G06K 9/00677 |
| | | | 382/118 |
| 8,611,681 B2 | 12/2013 | Genda | |
| 2002/0141650 A1 | 10/2002 | Keeney et al. | |
| 2004/0212712 A1 | 10/2004 | Stavely et al. | |
| 2005/0105768 A1 | 5/2005 | Yang et al. | |
| 2005/0259158 A1 | 11/2005 | Jacob et al. | |
| 2007/0024579 A1* | 2/2007 | Rosenberg | G06F 3/013 |
| | | | 345/156 |
| 2008/0147655 A1 | 6/2008 | Sinha et al. | |
| 2008/0154931 A1 | 6/2008 | Jacobs et al. | |
| 2008/0158666 A1 | 7/2008 | Seale et al. | |
| 2008/0297587 A1 | 12/2008 | Kurtz et al. | |
| 2008/0298766 A1* | 12/2008 | Wen | G06F 17/30259 |
| | | | 386/282 |
| 2009/0109795 A1 | 4/2009 | Marti | |
| 2009/0164450 A1 | 6/2009 | Martinez et al. | |
| 2009/0304232 A1 | 12/2009 | Tsukizawa | |
| 2010/0086200 A1 | 4/2010 | Stankiewicz et al. | |
| 2010/0111441 A1 | 5/2010 | Xiong et al. | |
| 2010/0189354 A1 | 7/2010 | De Campos et al. | |
| 2010/0245614 A1* | 9/2010 | Matsunaga | G06K 9/0061 |
| | | | 348/222.1 |
| 2010/0254609 A1 | 10/2010 | Chen et al. | |
| 2010/0293105 A1 | 11/2010 | Blinn et al. | |
| 2010/0295769 A1* | 11/2010 | Lundstrom | G06F 3/011 |
| | | | 345/156 |
| 2010/0310154 A1* | 12/2010 | Barrois | G01B 11/245 |
| | | | 382/154 |
| 2011/0006978 A1 | 1/2011 | Yuan | |
| 2011/0052086 A1* | 3/2011 | Tobita | G06F 17/30784 |
| | | | 382/224 |
| 2011/0229025 A1 | 9/2011 | Zhao et al. | |
| 2012/0140083 A1 | 6/2012 | Schultz et al. | |
| 2012/0154277 A1* | 6/2012 | Bar-Zeev | G02B 27/017 |
| | | | 345/158 |
| 2012/0224775 A1 | 9/2012 | Genda | |
| 2012/0230542 A1 | 9/2012 | Matraszek et al. | |
| 2012/0236030 A1 | 9/2012 | Border et al. | |
| 2012/0290401 A1 | 11/2012 | Neven | |
| 2013/0058529 A1 | 3/2013 | Levin et al. | |
| 2013/0148910 A1 | 6/2013 | Fredembach | |
| 2013/0230253 A1 | 9/2013 | Stankiewicz et al. | |

OTHER PUBLICATIONS

Wang, Jingdong et al. "Recommending Flickr Groups with Social Topic Model." Information Retrieval; Kluwer Academic Publishers. vol. 15, No. 3-4. Apr. 8, 2012. pp. 278-295.
Faro, Alberto et al. "Visual Attention for Implicit Relevance Feedback in a Content Based Image Retrieval." Proceedings of the 2010 Symposium on Eye-Tracking Research & Applications, ETRA '10. ACM. Mar. 22, 2010. pp. 73-76.
European Patent Office. International Search Report for Related International Patent Application No. PCT/US2013/076292. dated Apr. 22, 2014. 12 pages.
European Patent Office, Written Opinion received in International Patent Application No. PCT/US2013/065522, dated Apr. 18, 2015, 6 pages.
International Bureau of WIPO, International Preliminary Report on Patentability received for International Patent Application No. PCT/US2013/065522, dated Apr. 21, 2015, 7 pages.
European Patent Office, International Search Report received for International Patent Application No. PCT/US2013/065522, dated Jan. 8, 2014, 3 pages.
USPTO, Non-Final Office Action received for U.S. Appl. No. 13/655,182, dated May 22, 2014, 29 pages.
USPTO, Final Office Action received for U.S. Appl. No. 13/655,182, dated Oct. 10, 2014, 25 pages.
European Patent Office, Written Opinion received in International Patent Application No. PCT/US2013/076288, dated Jun. 20, 2015, 6 pages.
International Bureau of WIPO, International Preliminary Report on Patentability received in International Patent Application No. PCT/US2013/076288, dated Jun. 23, 2015, 7 pages.
European Patent Office, International Search Report received in International Patent Application No. PCT/US2013/076288, dated Jun. 26, 2014, 4 pages.
USPTO, Non-final Office Action for U.S. Appl. No. 13/723,065, dated Aug. 20, 2014, 23 pages.
USPTO, Final Office Action for U.S. Appl. No. 13/723,065, dated Mar. 12, 2015, 20 pages.
USPTO, Non-final Office Action for U.S. Appl. No. 13/723,065, Jul. 17, 2015, 31 pages.
International Bureau of WIPO, International Preliminary Report on Patentability received for International Patent Application No. PCT/US2013/076292, dated Jun. 23, 2015, 9 pages.
European Patent Office, International Search Report received for International Patent Application No. PCT/US2013/076292, dated Apr. 22, 2014, 3 pages.
European Patent Office, Written Opinion received for International Patent Application No. PCT/US2013/076292, dated Jun. 20, 2015, 8 pages.
USPTO, Non-Final Office Action received for U.S. Appl. No. 13/723,068, dated Jul. 17, 2014, 19 pages.
USPTO, Final Office Action received for U.S. Appl. No. 13/723,068, dated Jan. 13, 2015, 22 pages.
USPTO, Notice of Allowance received for U.S. Appl. No. 13/723,068, dated Apr. 21, 2015, 27 pages.
European Patent Office, International Preliminary Report on Patentability received for International Patent Application No. PCT/US2013/076632, dated Jun. 23, 2015, 7 pages.
USPTO, Final Office Action received for U.S. Appl. No. 13/723,073, dated Apr. 14, 2015, 29 pages.
USPTO, Notice of Allowance received for U.S. Appl. No. 13/723,073, dated Aug. 14, 2015, 30 pages.
European Patent Office, International Search Report received for International Patent Application No. PCT/US2013/076632, dated Apr. 7, 2014, 3 pages.
European Patent Office, Written Opinion received for International Patent Application No. PCT/US2013/076632, dated Jun. 20, 2015, 6 pages.
USPTO, First Action Interview, Pre-Interview Communication received for U.S. Appl. No. 13/723,059, dated Aug. 1, 2014, 17 pages.
USPTO, Notice of Allowance received for U.S. Appl. No. 13/723,059, dated Nov. 21, 2014, 16 pages.
European Patent Office, International Search Report received for International Patent Application No. PCT/US2013/076633, dated Apr. 9, 2014, 3 pages.
European Patent Office, Written Opinion received for International Patent Application No. PCT/US2013/076633, dated Jun. 20, 2014, 6 pages.
International Bureau of WIPO, International Preliminary Report on Patentability received for International Patent Application No. PCT/US2013/076633, dated Jun. 23, 2015, 7 pages.
USPTO, Non-Final Office Action received for U.S. Appl. No. 13/723,075, dated Aug. 22, 2014, 21 pages.
USPTO, Final Office Action received for U.S. Appl. No. 13/723,075, dated Dec. 24, 2014, 19 pages.
USPTO, Notice of Allowance received for U.S. Appl. No. 13/723,075, dated May 21, 2015, 22 pages.
European Patent Office, International Search Report received for International Patent Application No. PCT/US2013/076636, dated Apr. 3, 2014, 4 pages.

(56) References Cited

OTHER PUBLICATIONS

European Patent Office, Written Opinion received for International Patent Application No. PCT/US2013/076636, dated Jun. 20, 2014, 6 pages.
International Bureau of WIPO, International Preliminary Report on Patentability received for International Patent Application No. PCT/US2013/076636, dated Jun. 23, 2015, 7 pages.
Diginfotv, "Ubi-Camera—Take Photos With Your Hands", http://www.diginfo.tv/v/12-0047-r-en.php, Mar. 28, 2012, 3 pages.
Faro, A. et al., "Visual attention for implicit relevance feedback in a content based image retrieval," Proceedings of the 2010 Symposium on Eye-Tracking Research & Applications. ACM, Mar. 22, 2010, pp. 73-76.
Giordano, Daniela et al., "Content based recommender system by using eye gaze data," Proceedings of the Symposium on Eye Tracking Research and Applications. ACM, Mar. 28, 2012, pp. 369-372.
Wang, Jingdong et al., "Recommending Flickr groups with social topic model," Information retrieval 15.3-4, Apr. 8, 2012, 19 pages.
Spakov, et al. "Visualization of Eye Gaze Data Using Heat Maps," Electronics and Electrical Engineering No. 2(74), 2007, pp. 55-58.
USPTO, Final Office Action for related U.S. Appl. No. 13/723,065, dated Feb. 2, 2016, 20 pages.
USPTO, Notice of Allowance for U.S. Appl. No. 13/723,065, dated Sep. 23, 2016, 8 pages.
USPTO, Supplemental Notice of Allowability for U.S. Appl. No. 13/723,065, dated Oct. 12, 2016, 6 pages.

* cited by examiner

SHARING PHOTOS

CROSS REFERENCE TO RELATED APPLICATIONS

The present application is a continuation of U.S. patent application Ser. No. 13/723,068, filed Dec. 20, 2012 and titled SHARING PHOTOS, which is incorporated herein by reference in its entirety.

BACKGROUND

Digital cameras have made taking photos easy and convenient, and various applications have made sharing photos easy and convenient. For example, some applications enable a person to instantly upload photos to a social network system as photos are captured. Many people capturing photos of the same object are often positioned in the same or similar location. Accordingly, in many situations, numerous photos of the same object are captured, where the photos are substantially the same or are slight variations of each other.

SUMMARY

Implementations generally relate to sharing photos. In some implementations, a method includes collecting photos associated with one or more objects, where the photos are collected from a plurality of users. The method also includes collecting attention information associated with the one or more objects. The method also includes generating an attention map based on the attention information. The method also includes grouping the one or more photos into groups of photos based on the attention map. The method also includes causing the groups of photos to be displayed to a target user based on one or more predetermined criteria.

With further regard to the method, one or more of the photos are captured using one or more respective devices that are operable to track a gaze of a user. In some implementations, the attention information is based on tracking gazes of the plurality of users. In some implementations, the method further includes enabling the plurality of users to have access to the groups of photos. In some implementations, at least one group of photos includes photos of at least one object from different perspectives. In some implementations, at least one group of photos includes photos that receive a level of attention that meets a predefined attention threshold. In some implementations, at least one group of photos includes one or more photos of at least one person who is socially connected to the target user in a social network. In some implementations, at least one group of photos includes photos of at least one object that the target user has captured. In some implementations, the attention map is based on tracking gazes of one or more of the plurality of users. In some implementations, the generating of the attention map includes: receiving gaze information; identifying the one or more objects; associating the gaze information with each of the one or more objects; and determining an attention value for each of the one or more objects based on the gaze information.

In some implementations, a method includes collecting photos associated with one or more objects, where the photos are collected from a plurality of users, and where one or more of the photos are captured using one or more respective devices that are operable to track a gaze of a user. In some implementations, the method further includes collecting attention information associated with the one or more objects, where the attention information is based on tracking gazes of the plurality of users. In some implementations, the method further includes generating an attention map based on the attention information. In some implementations, the method further includes grouping the one or more photos into groups of photos based on the attention map, where at least one group of photos includes photos that receive a level of attention that meets a predefined attention threshold. In some implementations, the method further includes causing the groups of photos to be displayed to a target user based on one or more predetermined criteria.

In some implementations, a system includes one or more processors, and logic encoded in one or more tangible media for execution by the one or more processors. When executed, the logic is operable to perform operations including: collecting photos associated with one or more objects, where the photos are collected from a plurality of users; collecting attention information associated with the one or more objects; generating an attention map based on the attention information; grouping the one or more photos into groups of photos based on the attention map; and causing the groups of photos to be displayed to a target user based on one or more predetermined criteria.

With further regard to the system, one or more of the photos are captured using one or more respective devices that are operable to track a gaze of a user. In some implementations, the attention information is based on tracking gazes of the plurality of users. In some implementations, the logic when executed is further operable to perform operations including enabling the plurality of users to have access to the groups of photos. In some implementations, at least one group of photos includes photos of at least one object from different perspectives. In some implementations, at least one group of photos includes photos that receive a level of attention that meets a predefined attention threshold. In some implementations, at least one group of photos includes one or more photos of at least one person who is socially connected to the target user in a social network. In some implementations, at least one group of photos includes photos of at least one object that the target user has captured. In some implementations, the attention map is based on tracking gazes of one or more of the plurality of users.

DETAILED DESCRIPTION

Implementations described herein facilitate the sharing of photos among multiple people. In various implementations, the system facilitates the sharing of the photos based on an attention map. For example, the system may group and present collected photos of objects based on how much attention particular objects have received relative to other objects. This facilitates the overall photo sharing process among users, in that the system informs users of how popular particular objects are in the photos.

In some implementations, the system collects photos from multiple users, where one or more of the photos are captured using one or more respective devices that are operable to track a gaze of a user. The system then collects attention information associated with the one or more objects, where the attention information is based on tracking gazes of the users. The system then generates an attention map based on the attention information. In various implementations, the attention map shows how much attention particular objects have received relative to other objects.

As indicated above, the system facilitates the sharing of the photos based on an attention map. More specifically, the system groups one or more photos into various groups of photos based on how much attention particular objects have received relative to other objects. For example, the system may group photos based on different levels of attention that objects have received. In some implementations, the system may group photos of objects that have received a particular level of attention from one or more people with whom a target user is socially connected in a social network. In some implementations, the system displays groups of photos to the target user based on various criteria associated with attention levels. The system then enables the target user to have access to the groups of photos.

Figure 1:
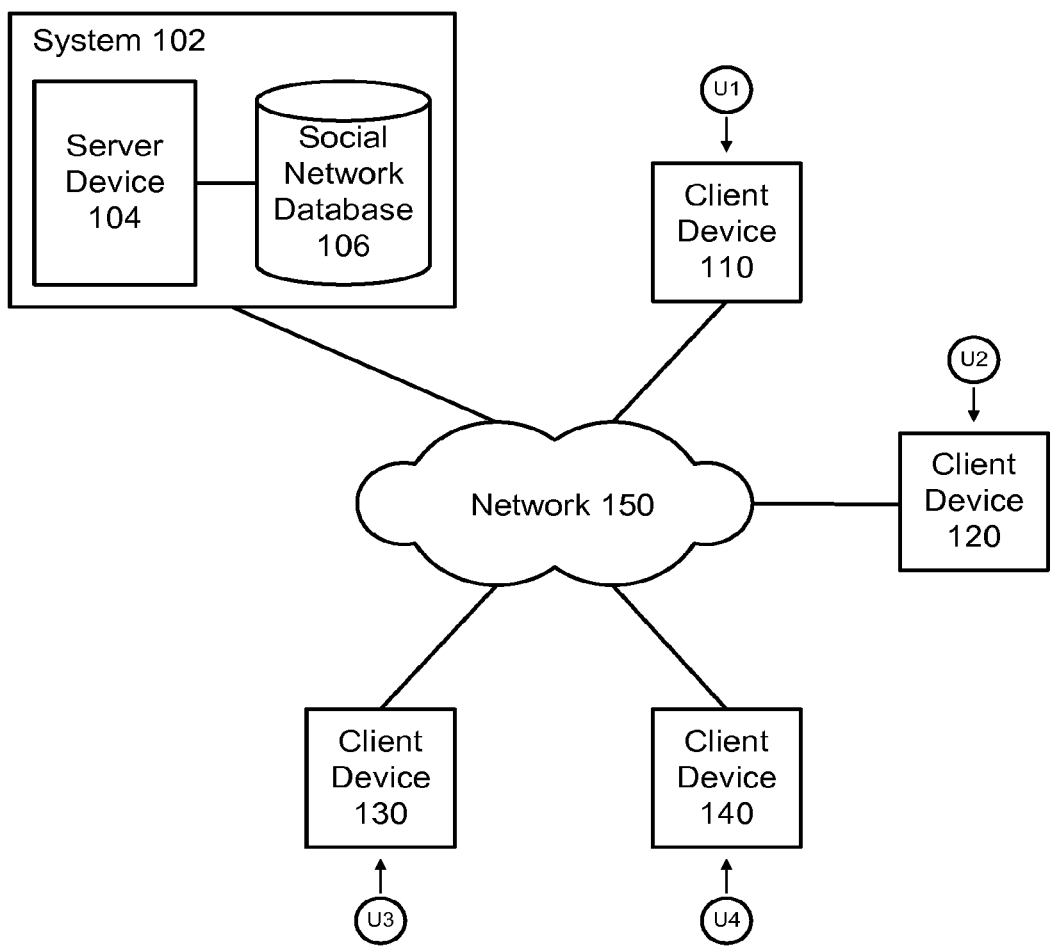
FIG. 1 illustrates a block diagram of an example network environment, which may be used to implement the implementations described herein.

FIG. 1 illustrates a block diagram of an example network environment 100, which may be used to implement the implementations described herein. In some implementations, network environment 100 includes a system 102, which includes a server device 104 and a social network database 106. The term system 102 and phrase "social network system" may be used interchangeably. Network environment 100 also includes client devices 110, 120, 130, and 140, which may communicate with each other via system 102 and a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other implementations, network environment 100 may not have all of the components shown and/or may have other elements including other types of elements instead of, or in addition to, those shown herein.

In various implementations, users U1, U2, U3, and U4 may communicate with each other using respective client devices 110, 120, 130, and 140. Users U1, U2, U3, and U4 may also use respective client devices 110, 120, 130, and 140 to take photos. In various implementations, client devices 110, 120, 130, and 140 may include any types of electronic devices such as mobile phones (e.g., smart phones), tablets, notebook computers, desktop computers, digital cameras, etc. Such client devices 110, 120, 130, and 140 that are not dedicated digital cameras may include integrated digital cameras.

In various implementations, system 102 may utilize an eye tracking device for collecting attention information, where the eye tracking device may be used in conjunction with a camera device, which may be a dedicated digital camera or a digital camera integrated with an electronic device (e.g., any of client devices 110, 120, 130, 140, etc.). The eye tracking device may itself be integrated with any one or more of client devices 110, 120, 130, 140, etc. As described in more detail below, such an eye tracking device may be any suitable eye tracking device that measures eye positions such as the point of gaze (e.g., the user's line of sight) and/or measures eye movement.

In some implementations, client devices 110, 120, 130, and 140 may include wearable computing devices, including any hands-free devices. For example, in some implementations, one or more client devices may include devices that operate with a head-mounted camera, head-mounted eye tracking device, and/or head-mounted display.

Figure 2:
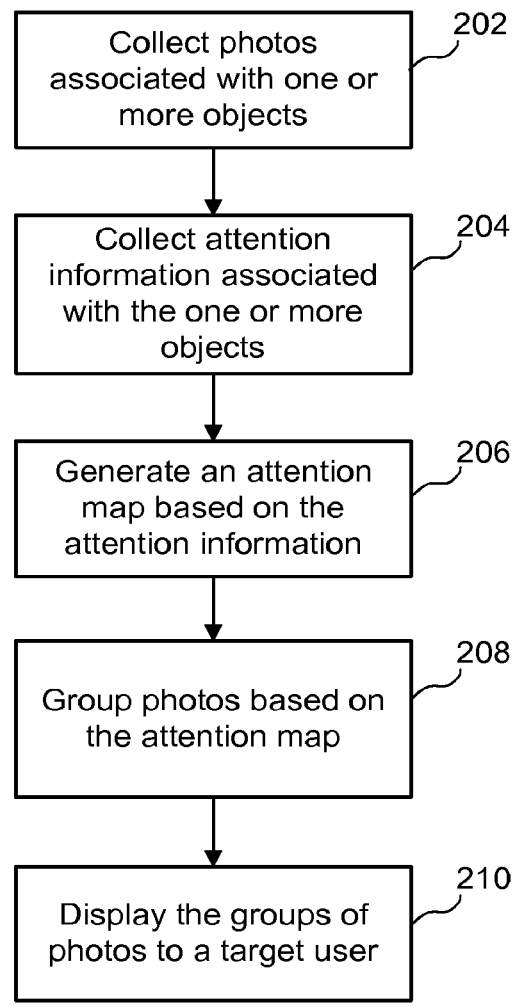
FIG. 2 illustrates an example simplified flow diagram for sharing photos among users, according to some implementations.

FIG. 2 illustrates an example simplified flow diagram for sharing photos among users, according to some implementations. Referring to both FIGS. 1 and 2, a method is initiated in block 202, where system 102 collects photos associated with one or more objects, where the photos are collected from multiple users. For example, system 102 may collect photos of the same object from many different people, from many different vantage points.

Figure 3A:
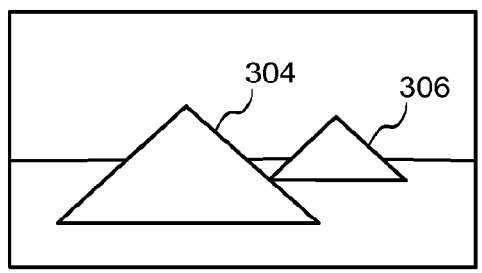
FIGS. 3A, 3B, 3C, and 3D illustrate example simplified photos of objects from different vantage points.
Figure 3B:
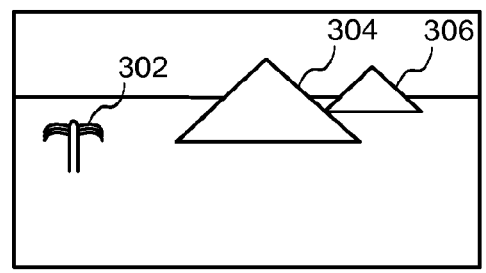
Figure 3C:
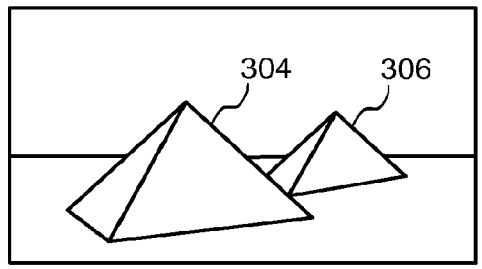
Figure 3D:
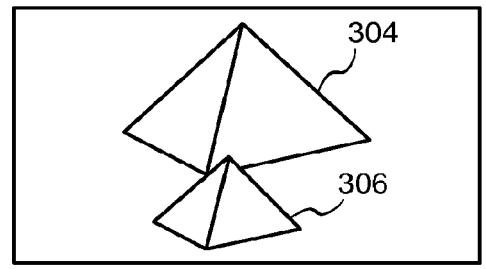

FIGS. 3A, 3B, 3C, and 3D illustrate example simplified photos of objects from different vantage points. FIG. 3A shows two pyramids 304 and 306 in a desert setting. FIG. 3B shows the same two pyramids 304 and 306 from a further distance as shown in FIG. 3A. FIG. 3B also shows a tree 302. FIGS. 3C and 3D show two pyramids 304 and 306 from different vantage points.

For ease of illustration, FIGS. 3A, 3B, 3C, and 3D show four different vantages points, and these vantage points are significantly distinct. Many other vantage points are possible, depending on the particular scenario. Furthermore, many people capturing photos of the same object are often positioned in the same or similar location. For example, two people could be standing next to each other while capturing photos of the same object. In another example, two people could take turns standing in the same spot to capture photos of the same object. Accordingly, in many situations, numerous photos of the same object are substantially the same or slight variations of each other. Such variations in photos may be due to gaze differences (e.g., differences in height among people, etc.), camera differences (e.g., differences in quality, settings, etc.), lighting differences (e.g., differences in time of day, weather, etc.), background and environmental differences (e.g., variations in the sky, clouds, airplanes, etc.), foreground differences (e.g., people, friends, family, etc.), etc.

In block 204, system 102 collects attention information associated with the one or more objects. The one or more objects may be set in any given visual context. For example, a given object may be a pyramid in a desert setting, as shown in the examples of FIGS. 3A, 3B, 3C, and 3D. Other examples may include a statue in a plaza, a particular person's face in a group of people, etc.

In various implementations, attention information characterizes the attention (e.g., focus, fixation points, etc.) of a given user with respect to a particular object during any given point in time. In various implementations, attention information may include any combination of attention values, attention parameter values, and gaze information, which are described in more detail below.

In some implementations, gaze information may include various gaze parameter values associated with pitch, yaw, roll, line of sight, field of view, etc. In various implementations, one or more of the photos are captured using one or more respective devices that are operable to track the gaze (e.g., line of sight) of a user. Devices that are operable to track a gaze facilitate system 102 in determining values of gaze parameters such as pitch, yaw, roll, line of sight, field of view, etc. For example, a given device while capturing photos may also capture gaze information. Such an eye tracking device may be any suitable eye tracking device that measures the point of gaze (e.g., the user's line of sight). Example implementations of a device that is operable to track the gaze of a user are described in more detail below in connection with FIG. 4.

For ease of illustration, some implementations are described herein in the context of the gaze of a single user. These implementations and others also apply to gazes of multiple users. For example, for a given object (e.g., a pyramid), system 102 may track, log, and aggregate the gaze information of multiple users. As such, in some implementations, attention information is based on tracking gazes of one or more users. Example implementations involving attention information are described in detail below in connection with FIG. 5.

In block 206, system 102 generates an attention map based on the attention information. The attention map shows how much attention particular objects have received relative to other objects. In various implementations, the attention map is based on various aspects of attention information. For example, the attention map may be based on tracking gazes of one or more of the users relative to one or more objects (e.g., gaze information), and/or based on any other aspect of attention information such as attention values, attention parameter values, etc.). Example implementations directed to generating an attention map are described in more detail below in connection with FIG. 5.

In block 208, system 102 groups the one or more photos into groups of photos based on the attention map. For example, system 102 may group photos of a given object (e.g., a monument) or portion of an object that is popular among tourists (e.g., receiving high attention from different people). Example implementations directed to grouping photos into groups of photos based on an attention map are described in more detail below in connection with FIG. 7.

In block 210, system 102 causes the groups of photos to be displayed to a target user based on one or more predetermined criteria. For example, system 102 may cause the groups of photos to be displayed on the display screen of the user's mobile device. In various implementations, the criteria may be based on attention thresholds. For example, in some implementations, system 102 may display groups of photos of objects that have an attention level that meets a predetermined attention threshold. In other words, system 102 may display to the target user groups of the most popular photos. In another example, the criteria may be based on social network aspects. For example, in some implementations, system 102 may display to the target user groups of photos taken by users who are socially connected to the target user. In another example, the criteria may be based on objects themselves. For example, system 102 may display groups of photos showing objects that the target user has also captured in photos. In various implementations, system 102 enables users to have access to the groups of photos, where a given target user may view different groups of photos to select photos to access.

Figure 4:
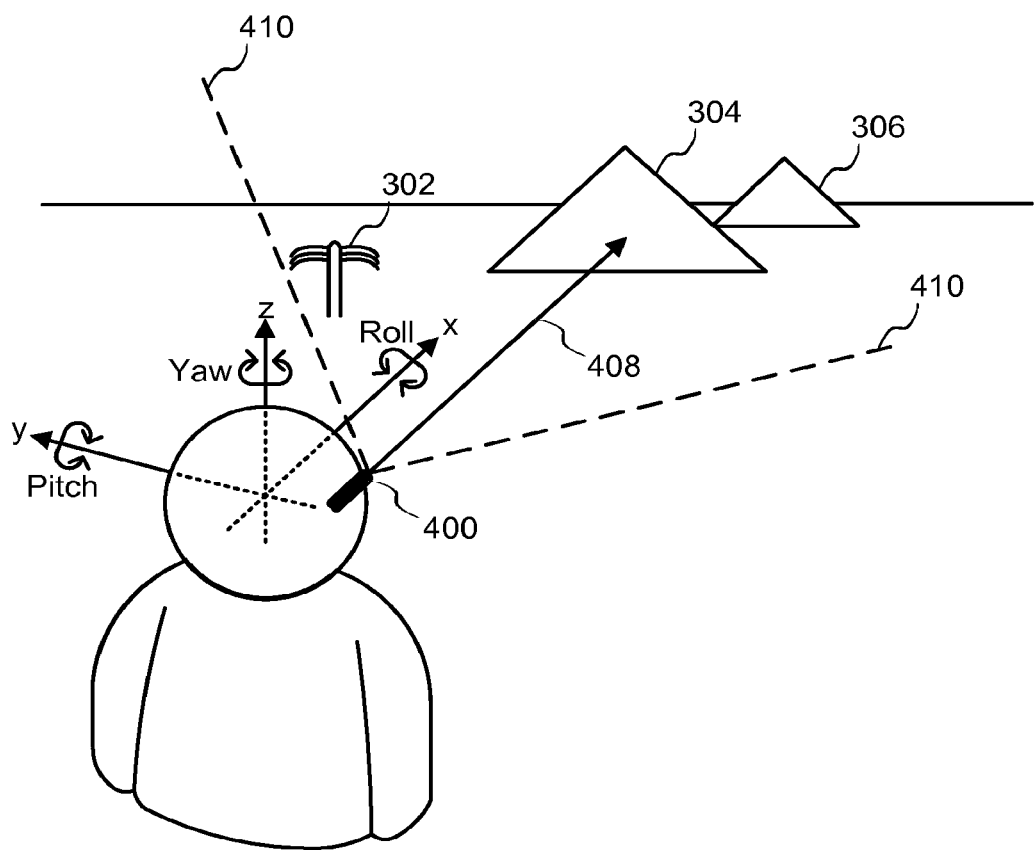
FIG. 4 illustrates an example diagram of an eye tracking device that tracks the gaze of a user, according to some implementations.

FIG. 4 illustrates an example diagram of an eye tracking device 400 that tracks the gaze of a user, according to some implementations. In some implementations, eye tracking device 300 may be positioned in the head area of the user. For example, as shown, eye tracking device 300 may be positioned relatively close to an eye of the user.

In various implementations, eye tracking device 400 may use suitable eye tracking technologies, including any suitable eye-tracking hardware components and algorithms, to measure eye positions and eye movement. For example, eye tracking device 400 may use any suitable eye tracking technologies to measure the gaze of the user (e.g., the user's line of sight) or the motion of an eye relative to the head. For example, eye tracking device 400 may use a laser and laser technology to measure eye positions and eye movement relative to objects in the environment.

In some implementations, eye tracking device 400 may track the gaze of the user by tracking one or more parameters such as pitch, yaw, roll, line of sight, field of view, etc. FIG. 4 shows a pitch axis, yaw axis, and roll axis to illustrate how eye tracking device 400 may move depending on eye movement and/or head movement of the user, as the attention that the user places on particular objects would influence and correlate to both eye movement and head movement of the user.

FIG. 4 shows example objects 302, 304, and 306, where object 302 is a tree, object 304 is a large pyramid, and object 306 is a small pyramid. As shown, objects 302, 304, and 306 are in user's line of site 408 and in the user's field of view 410. For ease of illustration, FIG. 4 shows three objects 302, 304, and 306. Any given scene in the user's field of view 410 may include any number of objects, including people.

In some implementations, system 102 may receive gaze information (e.g., parameter values associated with tracked parameters) directly from eye tracking device 400 or from any other one or more suitable storage locations. For example, in some implementations, eye tracking device 400 may send gaze information to system 102 as the user gazes at particular objects. In some implementations, when used with a camera device, eye tracking device 400 may send gaze information to system 102 as a camera device sends photos to system 102 (e.g., as the photos are captured). In some implementations, eye tracking device 400 may store gaze information local to the user's client device (e.g., if used with a dedicated digital camera, or if used with a mobile phone or other electronic device that has an integrated digital camera, etc.).

Figure 5:
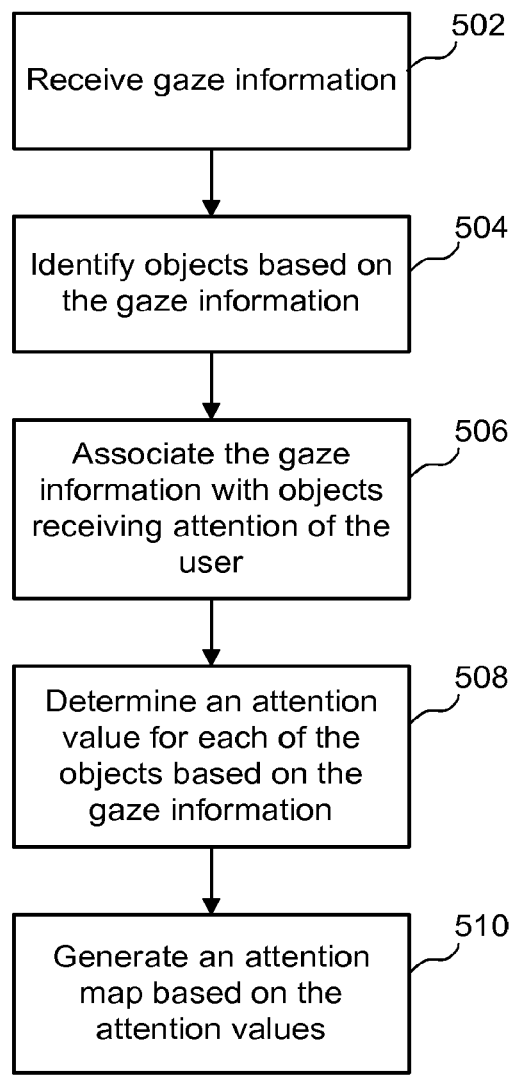
FIG. 5 illustrates an example simplified flow diagram for generating an attention map, according to some implementations.

FIG. 5 illustrates an example simplified flow diagram for generating an attention map, according to some implementations. Referring to FIGS. 1, 4, and 5, a method is initiated in block 502, where system 102 receives gaze information. In some implementations, the gaze information associated with a given user may also be referred to as the gaze pattern of the user, or the gaze of the user. As indicated above, the gaze information may include one or more parameter values associated with gaze parameters such as pitch, yaw, roll, line of sight, field of view, etc.

In some implementations, where photos are provided by users and where the photos are associated with the gaze information, system 102 may also associate geotags with both the photos and gaze information. System 102 may include such geotags in the gaze parameters. In some implementations, where photos are not provided, system 102 may include geographical coordinates from gaze information, and include such geographical coordinates with the gaze parameters In block 504, system 102 identifies objects based on the gaze information. In some implementations, system 102 may receive one or more photos of one or more objects. System 102 may then identify objects in each photo via any suitable object identification algorithm.

In some implementations, system 102 may also recognize the identified objects. For example, after system 102 identifies an object such as a monument or face, system 102 may then apply a suitable recognition algorithm to recognize an identity associated with the particular object (e.g., monument or particular person). Example implementations directed to object recognition are described in more detail below.

In some implementations, system 102 may receive gaze information independently of photos being captured. In some implementations, system 102 may also identify a given object based on the gaze information even before the user captures a photo of the object or even if the user does not ultimately capture a photo of the object. Accordingly, system 102 may capture gaze information even if the user is not concurrently capturing photos. In various implementations, system 102 may track only gaze information without recognizing which user is providing the gaze information. In other words, gaze information may be anonymous. In some implementations, a given user may want system 102 to recognizing the given user as the user providing the gaze information in order to enable system 102 in providing individual and/or customized services for the user. As described in more detail below, system 102 enables users to specify and/or consent to the use of personal information, including gaze information.

In block 506, system 102 associates the gaze information with each of the one or more objects receiving the attention of the user. For example, in some implementations, the gaze information (e.g., the combination of gaze parameter values) characterizes the gaze of the user. System 102 may determine, from the gaze information, fixation points on one or more objects in a given photo, including fixation points at particular portions of such objects.

Note that a photo need not necessarily be provided by the user associated with the gaze information. System 102 may determine an appropriate photo based on geolocation information, other photos provided by the user associated with the gaze information, etc. In some implementations, where system 102 aggregates gazes from multiple users, system 102 may associate the gaze information from the different users with the same one or more objects. For example, referring to FIG. 4, if multiple users gaze at object 304, system 102 may associate the gaze information associated with all of such users with the same object 304.

In block 508, system 102 determines an attention value for each of the one or more objects based on the gaze information. In some implementations, the attention value may be based on one or more attention parameter values. Such attention parameters may include, for example, the amount of time a given user gazed at a given object. In some implementations, such attention parameters have corresponding attention subvalues that system 102 may aggregate in order to derive a given attention value. In various implementations, the phrase "attention parameter value" may be use interchangeably with the phrase "attention subvalue."

In some implementations, system 102 may assign an attention subvalue that is proportional to the total amount of time that the user gazed at the object. For example, system 102 may assign a higher attention subvalue if the user gazed at the object for 10 minutes versus only 2 minutes.

In some implementations, system 102 may assign an attention subvalue that is proportional to the total number of times that the user gazed at a given object. For example, system 102 may assign a higher attention subvalue if the user gazed at the object 5 different times versus a single time.

In some implementations, system 102 may assign an attention subvalue that is proportional to the total size and/or percentage of a given object at which the user gazed. For example, system 102 may assign a higher attention subvalue if the user gazed at 75% of the object versus 25% of the object.

In some implementations, system 102 may assign an attention subvalue that is proportional to the total number of people who gazed at a given object. For example, system 102 may assign a higher attention subvalue if 1,000 people gazed at the object versus 5 people. Other attention parameters are possible, and the particular number of attention parameters and the types of parameters will depend on the particular implementation.

In block 510, system 102 generates an attention map based on the attention values. As indicated above, the attention map may be based on attention information in that the attention information may in turn be based on attention values. An example attention map is described in more detail below in connection with FIG. 6.

Figure 6:
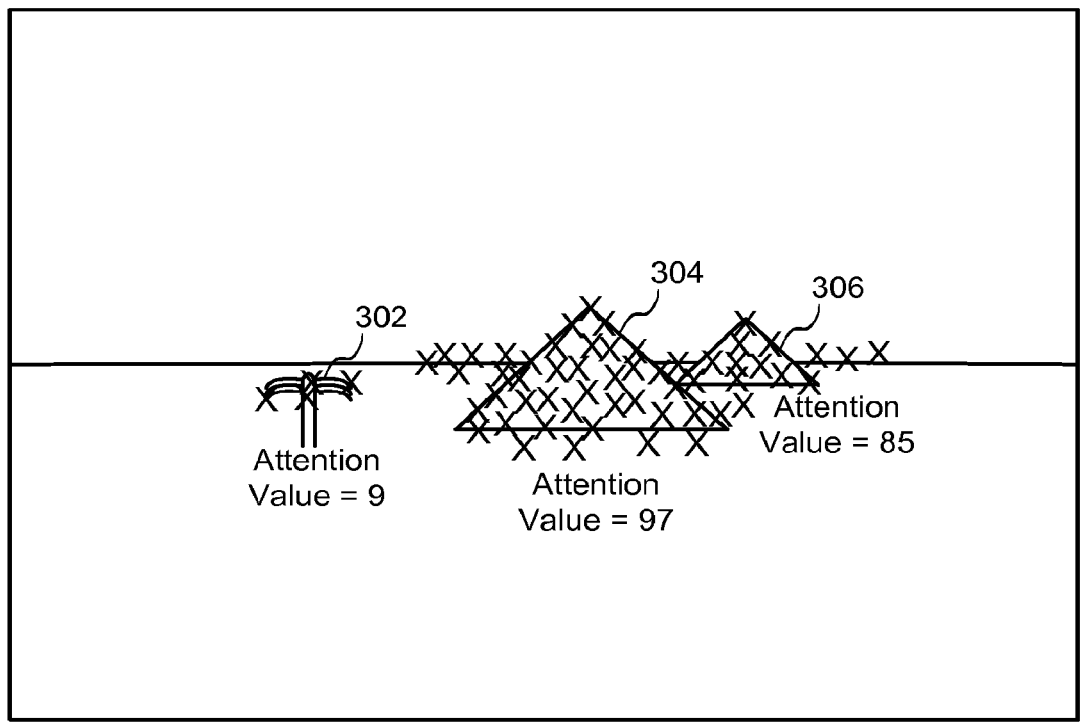
FIG. 6 illustrates an example diagram of an attention map, according to some implementations.

FIG. 6 illustrates an example diagram of an attention map 600, according to some implementations. As indicated above, an attention map shows how much attention particular objects have received relative to other objects. As shown, objects 302, 304, and 306 are shown with Xs overlaid, where the number of Xs is proportional to the attention value. In some implementations, objects 302, 304, and 306 may each be shown with an actual attention value. For example, as shown in this example implementation, object 302 has an attention value of 9, object 304 has an attention value of 97, and object 306 has an attention value of 85. The range of attention values may vary (e.g., 0 to 1.0; 0 to 100; 1 to 1,000, etc.), and the particular range and/or numbering scheme will depend on the particular implementation.

In some implementations, system 102 may assign a color to each object, where the particular color may correspond to the size of the attention value. For example, an object associated with yellow may have a relatively higher attention value than an object associated with blue; an object associated with orange may have a relatively higher attention value than an object associated with yellow; an object associated with red may have a relatively higher attention value than an object associated with orange. The particular color scheme will vary, depending on the particular implementation.

Figure 7:
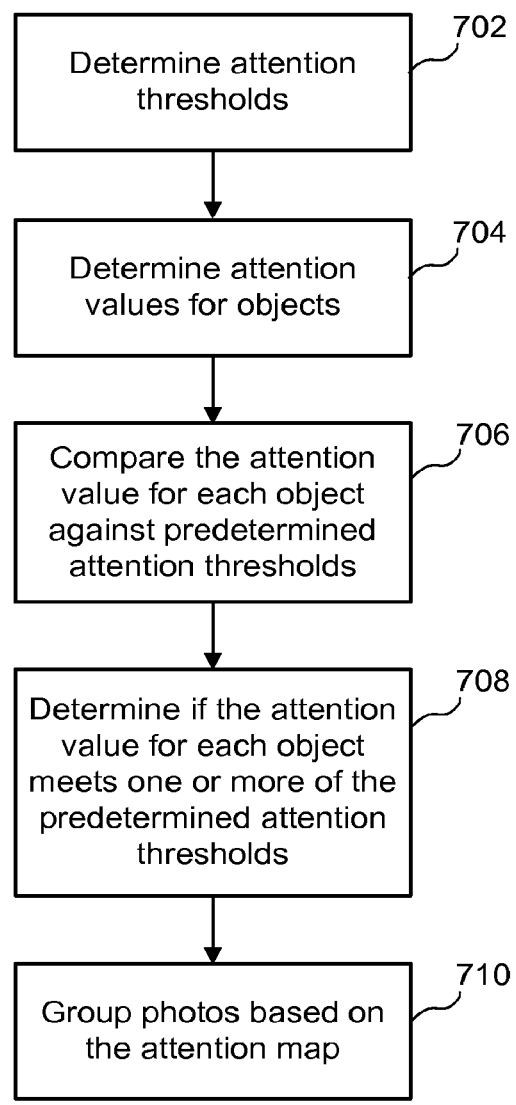
FIG. 7 illustrates an example simplified flow diagram for grouping photos based on an attention map, according to some implementations.

FIG. 7 illustrates an example simplified flow diagram for grouping photos based on an attention map, according to some implementations. As described in more detail below, system 102 group photos into various groups of photos based on the attention map in order to facilitate users in sharing photos with each other.

In some implementations, a method is initiated in block 702, where system 102 determines one or more attention thresholds. System 102 may associate predetermined attention thresholds proportionally with levels of attention. For example, system 102 may associate a relatively lower attention threshold with a relatively lower level of attention. Conversely, system 102 may associate a relatively higher attention threshold with a relatively higher level of attention.

The actual number of predetermined thresholds may vary, and will depend on the particular implementation.

In block 704, system 102 determines an attention value for each of the one or more objects. Various implementations directed to attention values are described above in connection with FIG. 5.

In block 706, system 102 compares the attention value for each object against one or more predetermined attention thresholds.

In block 708, system 102 determines if the attention value for each object meets one or more of the predetermined attention thresholds. In some implementations, an attention value meets a given attention threshold if the attention value is greater than the attention threshold. In some implementations, an attention value meets a given attention threshold if the attention value is greater than or equal to the attention threshold. Also, a given attention value may meet multiple attention thresholds. In some implementations, system 102 may associate the attention value with the highest attention threshold met for the purposes of grouping photos for sharing among users. The particular criteria for meeting an attention threshold may vary and will depend on the particular implementation.

In block 710, system 102 groups the photos based on the attention map. More specifically, system 102 groups one or more photos into various groups of photos based on how much attention particular objects have received relative to other objects. In some implementations, system 102 may group photos based on different levels of attention that objects in the photos have received. For example, a given group of photos may include photos that receive a level of attention that meets a first predefined attention threshold (e.g., very popular). Another group of photos may include photos that receive a level of attention that meets a second predefined attention threshold (e.g., somewhat popular).

In some implementations, system 102 may group photos of one or more objects that have received a particular level of attention, where the photos show the one or more objects from different perspectives. In some implementations, the system may group photos of objects that have received a particular level of attention from one or more people with whom the target user is socially connected in a social network.

In some implementations, the system may group photos of objects that have received a particular level of attention, where the photos include objects that the target user has captured in photos.

In various implementations, system 102 may create multiple predetermined attention thresholds corresponding with multiple levels of attention (e.g., levels of popularity) among users. As such, system 102 may group photos into different groups associated with different levels of popularity for the user to consider when accessing photos. As a result, system 102 enables users to access a large pool of photos of the same object(s) based on various attention levels associated with the object(s).

Although the steps, operations, or computations described herein may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

While system 102 is described as performing the steps as described in the implementations herein, any suitable component or combination of components of system 102 or any suitable processor or processors associated with system 102 may perform the steps described.

In various implementations, system 102 may utilize a variety of recognition algorithms to recognize faces, landmarks, objects, etc. in photos. Such recognition algorithms may be integral to system 102. System 102 may also access recognition algorithms provided by software that is external to system 102 and that system 102 accesses.

In various implementations, system 102 enables users to specify and/or consent to the use of personal information. Use of personal information may include, for example, system 102 using their faces in photos or using their identity information in recognizing people identified in photos, and may also include system 102 tracking the gaze of a user even when the user is not capturing photos. In some implementations, system 102 may provide users with multiple selections directed to specifying and/or consenting to the use of personal information. For example, selections with regard to specifying and/or consenting may be associated with individual photos, all photos, individual photo albums, all photo albums, etc. The selections may be implemented in a variety of ways. For example, system 102 may cause buttons or check boxes to be displayed next to various selections. In some implementations, system 102 enables users to specify and/or consent to the use of using their photos for facial recognition in general. Example implementations for recognizing faces and other objects are described in more detail below.

In various implementations, system 102 obtains reference images of users, where each reference image includes an image of a face that is associated with a known user. The user is known, in that system 102 has the user's identity information such as the user's name and other profile information. In some implementations, a reference image may be, for example, a profile image that the user has uploaded. In some implementations, a reference image may be based on a composite of a group of reference images.

In some implementations, to recognize a face in a photo, system 102 may compare the face (i.e., image of the face) and match the face to reference images of users. Note that the term "face" and the phrase "image of the face" are used interchangeably. For ease of illustration, the recognition of one face is described in some of the example implementations described herein. These implementations may also apply to each face of multiple faces to be recognized.

In some implementations, system 102 may search reference images in order to identify any one or more reference images that are similar to the face in the photo. In some implementations, for a given reference image, system 102 may extract features from the image of the face in a photo for analysis, and then compare those features to those of one or more reference images. For example, system 102 may analyze the relative position, size, and/or shape of facial features such as eyes, nose, cheekbones, mouth, jaw, etc. In some implementations, system 102 may use data gathered from the analysis to match the face in the photo to one more reference images with matching or similar features. In some implementations, system 102 may normalize multiple reference images, and compress face data from those images into a composite representation having information (e.g., facial feature data), and then compare the face in the photo to the composite representation for facial recognition.

In some scenarios, the face in the photo may be similar to multiple reference images associated with the same user. As such, there would be a high probability that the person associated with the face in the photo is the same person associated with the reference images.

In some scenarios, the face in the photo may be similar to multiple reference images associated with different users. As such, there would be a moderately high yet decreased probability that the person in the photo matches any given person associated with the reference images. To handle such a situation, system 102 may use various types of facial recognition algorithms to narrow the possibilities, ideally down to one best candidate.

For example, in some implementations, to facilitate in facial recognition, system 102 may use geometric facial recognition algorithms, which are based on feature discrimination. System 102 may also use photometric algorithms, which are based on a statistical approach that distills a facial feature into values for comparison. A combination of the geometric and photometric approaches could also be used when comparing the face in the photo to one or more references.

Other facial recognition algorithms may be used. For example, system 102 may use facial recognition algorithms that use one or more of principal component analysis, linear discriminate analysis, elastic bunch graph matching, hidden Markov models, and dynamic link matching. It will be appreciated that system 102 may use other known or later developed facial recognition algorithms, techniques, and/or systems.

In some implementations, system 102 may generate an output indicating a likelihood (or probability) that the face in the photo matches a given reference image. In some implementations, the output may be represented as a metric (or numerical value) such as a percentage associated with the confidence that the face in the photo matches a given reference image. For example, a value of 1.0 may represent 100% confidence of a match. This could occur, for example, when compared images are identical or nearly identical. The value could be lower, for example 0.5 when there is a 50% chance of a match. Other types of outputs are possible. For example, in some implementations, the output may be a confidence score for matching.

For ease of illustration, some example implementations described herein have been described in the context of a facial recognition algorithm. Other similar recognition algorithms and/or visual search systems may be used to recognize objects such as landmarks, logos, entities, events, etc. in order to implement implementations described herein.

Implementations described herein provide various benefits. For example, implementations described herein provide users with a large pool of photos for a given object. Implementations also increase the size of the pool and evolve the pool by guiding users to capture particular photos based on an attention map.

Figure 8:
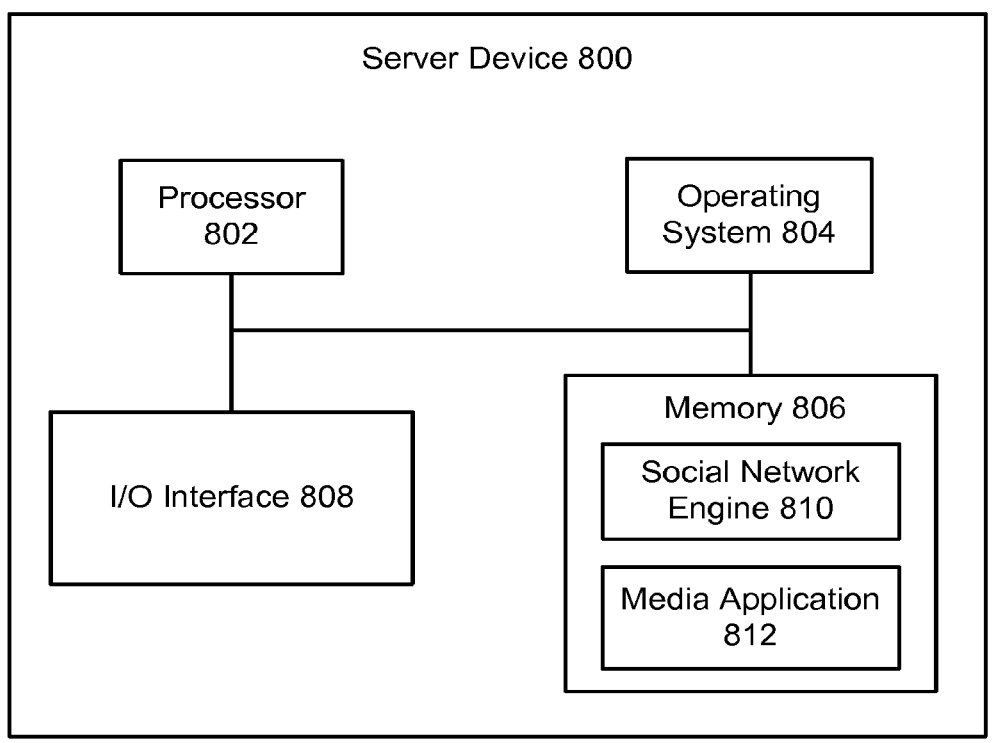
FIG. 8 illustrates a block diagram of an example server device, which may be used to implement the implementations described herein.

FIG. 8 illustrates a block diagram of an example server device 800, which may be used to implement the implementations described herein. For example, server device 800 may be used to implement server device 104 of FIG. 1, as well as to perform the method implementations described herein. In some implementations, server device 800 includes a processor 802, an operating system 804, a memory 806, and an input/output (I/O) interface 808. Server device 800 also includes a social network engine 810 and a media application 812, which may be stored in memory 806 or on any other suitable storage location or computer-readable medium. Media application 812 provides instructions that enable processor 802 to perform the functions described herein and other functions.

For ease of illustration, FIG. 8 shows one block for each of processor 802, operating system 804, memory 806, I/O interface 808, social network engine 810, and media application 812. These blocks 802, 804, 806, 808, 810, and 812 may represent multiple processors, operating systems, memories, I/O interfaces, social network engines, and media applications. In other implementations, server device 800 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and implementations.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

What is claimed is:

1. A computer-implemented method comprising:
   receiving gaze information from one or more devices that track gazes of users;
   identifying a first object and a second object that were viewed by one or more of the users based at least in part on the gaze information;
   determining a first attention value for the first object and a second attention value for the second object based on the gaze information; and
   generating an attention map for the first object and the second object based on the first attention value and the second attention value, wherein the first object was viewed more than the second object.

2. The computer-implemented method of claim 1, further comprising receiving one or more photos from one or more of the users, wherein the photos are associated with the gaze information.

3. The computer-implemented method of claim 2, wherein the one or more photos include an image of the first object.

4. The computer-implemented method of claim 2, wherein the one or more photos include a geotag.

5. The computer-implemented method of claim 4, wherein identifying the first object and the second object is further based on the geotag.

6. The computer-implemented method of claim 1, wherein the gaze information includes geographical coordinates.

7. The computer-implemented method of claim 1, wherein associating the gaze information with the first object comprises determining one or more fixation points on the first object based on the gaze information.

8. The computer-implemented method of claim 1, wherein determining the first attention value for the first object and the second attention value for the second object comprises determining the first attention value based on one or more of: an amount of time the user gazed at the first object, a total amount of time that the user gazed at the first object, a number of times the user gazed at the first object, and a size of the first object at which the user gazed.

9. A system comprising:
one or more processors; and
logic encoded in one or more tangible media for execution by the one or more processors and when executed operable to perform operations comprising:
receiving photos and gaze information from one or more devices that track gazes of users;
identifying a first object and a second object in the photos;
determining a first attention value for the first object and a second attention value for the second object based on the gaze information;
generating an attention map for the first object and the second object based on the first attention value and the second attention value, wherein the first object was viewed more than the second object; and
grouping the photos based on the attention map.

10. The system of claim 9, wherein one or more of the photos include a geotag.

11. The system of claim 10, wherein identifying the first object and the second object is further based on the geotag.

12. The system of claim 9, wherein the gaze information includes geographical coordinates.

13. The system of claim 1, wherein associating the gaze information with the first object comprises determining one or more fixation points on the first object based on the gaze information.

14. A non-transitory computer storage medium encoded with a computer program, the computer program comprising instructions that, when executed by one or more processors, cause the one or more processors to perform operations comprising:
receiving gaze information from one or more devices that track gazes of users;
identifying a first object and a second object that were viewed by one or more of the users based at least in part on the gaze information;
determining a first attention value for the first object and a second attention value for the second object based on the gaze information; and
generating an attention map for the first object and the second object based on the first attention value and the second attention value, wherein the first object was viewed more than the second object.

15. The computer storage medium of claim 14, wherein the operations further comprise receiving one or more photos from one of the users, wherein the photos are associated with the gaze information.

16. The computer storage medium of claim 15, wherein the one or more photos include an image of the first object.

17. The computer storage medium of claim 15, wherein the one or more photos include a geotag.

18. The computer storage medium of claim 17, wherein identifying the first object and the second object is further based on the geotag.

19. The computer storage medium of claim 14, wherein the gaze information includes geographical coordinates.

20. The computer storage medium of claim 14, wherein associating the gaze information with the first object comprises determining one or more fixation points on the first object based on the gaze information.

* * * * *